(12) United States Patent
Lorphelin

(10) Patent No.: US 12,154,553 B2
(45) Date of Patent: Nov. 26, 2024

(54) METHOD AND SYSTEM FOR ENRICHING DIGITAL CONTENT REPRESENTATIVE OF A CONVERSATION

(71) Applicant: 100 BREVETS POUR LA FRENCH TECH, Paris (FR)

(72) Inventor: Vincent Lorphelin, Paris (FR)

(*) Notice: Subject to any disclaimer, the term of this patent is extended or adjusted under 35 U.S.C. 154(b) by 370 days.

(21) Appl. No.: 17/597,548

(22) PCT Filed: Aug. 12, 2020

(86) PCT No.: PCT/EP2020/072671
§ 371 (c)(1),
(2) Date: Jan. 11, 2022

(87) PCT Pub. No.: WO2021/028501
PCT Pub. Date: Feb. 18, 2021

(65) Prior Publication Data
US 2022/0254336 A1 Aug. 11, 2022

(30) Foreign Application Priority Data

Aug. 12, 2019 (FR) ..................................... 1909164

(51) Int. Cl.
*G10L 15/00* (2013.01)
*G06F 40/166* (2020.01)
(Continued)

(52) U.S. Cl.
CPC ........ *G10L 15/1815* (2013.01); *G06F 40/166* (2020.01); *G06Q 50/01* (2013.01);
(Continued)

(58) Field of Classification Search
None
See application file for complete search history.

(56) References Cited

U.S. PATENT DOCUMENTS

| 7,716,048 B2 * | 5/2010 | Pereg | G10L 25/00 379/88.01 |
| 8,219,429 B2 * | 7/2012 | Blair | G06Q 10/06 705/7.11 |

(Continued)

*Primary Examiner* — Satwant K Singh
(74) *Attorney, Agent, or Firm* — Patshegen IP; Moshe Pinchas

(57) ABSTRACT

The method (3000) of enriching digital content representative of a conversation comprises: in an iterative manner:
a step (3005) of capturing an audio signal representative of a voice message,
a step (3010) of segmenting the voice message into a segment, said segmentation step comprising a silence detection step, the segment being obtained as a function of the detection of a silence
a step (3015) of converting the audio segment into text, called "contribution", and
a step (3020) of storing, in a memory, a contribution, then:
a step (3025) of detecting user sentiment towards at least one stored contribution
a step (3030) of associating, in a memory and in relation to at least one stored contribution, at least one attribute corresponding to at least one detected sentiment and
a step (3035) of displaying at least one stored contribution and at least one attribute with respect to said at least one contribution.

9 Claims, 16 Drawing Sheets

(51) Int. Cl.
  *G06Q 50/00*   (2012.01)
  *G06V 20/40*   (2022.01)
  *G06V 40/20*   (2022.01)
  *G10L 15/04*   (2013.01)
  *G10L 15/18*   (2013.01)
  *G10L 15/22*   (2006.01)
  *G10L 25/57*   (2013.01)

(52) U.S. Cl.
  CPC .............. *G06V 20/41* (2022.01); *G06V 40/20* (2022.01); *G10L 15/04* (2013.01); *G10L 15/22* (2013.01); *G10L 25/57* (2013.01)

(56) References Cited

U.S. PATENT DOCUMENTS

| | | | |
|---|---|---|---|
| 10,038,886 B2* | 7/2018 | Furesjö | G06F 3/0485 |
| 10,127,825 B1* | 11/2018 | Nguyen | G09B 5/065 |
| 10,242,669 B1* | 3/2019 | Sandler | G10L 15/22 |
| 10,373,510 B2* | 8/2019 | Nguyen | G09B 5/06 |
| 2019/0087424 A1* | 3/2019 | Cheng | G10L 15/22 |

* cited by examiner

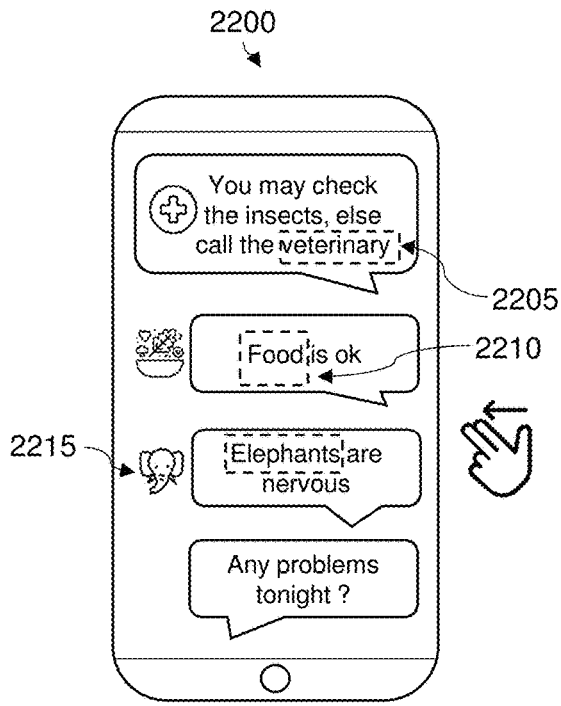

METHOD AND SYSTEM FOR ENRICHING DIGITAL CONTENT REPRESENTATIVE OF A CONVERSATION

TECHNICAL SCOPE OF THE INVENTION

The present invention concerns a method and a system for enriching a digital content representative of a conversation. It applies, in particular, to the field of digital communication.

STATE OF THE ART

Social networks such as Whatsapp (Trademark) or Facebook Messenger (Trademark) are known to allow users to exchange information asynchronously, to group themselves by project or center of interest, to create address books and lists of recipients of this information.

In a professional context, Slack (Trademark) is a collaborative communication software associated with a project management software. Other modules allow for file sharing, instant messaging, voice calls, video conference calls, screen sharing and searchable document archiving.

To facilitate collaboration, communication takes place in conversation chains organized by project, topic or team. Conversations are searchable by everyone in the company using keywords or a text search engine, making it easy to share knowledge. Other tools such as Salesforce (Trademark) or Zoom (Trademark) can be called by buttons generated by "/salesforce" or "/zoom" tags entered in a message. However, none of these communication systems allows to obtain, in the form of manipulatable data, the opinions of participants regarding the different contributions to an oral conversation.

To go in the same direction, there is no system allowing to enrich the communication, i.e. to transform the messages of the users of a social network to allow the reading of what these messages mean in a directly usable form: comprehensible, synthetic, transmissible, graphic, to provoke, guide or stimulate actions of users of the network, to provide them a tool of research, collection and evaluation of the contributions of each one, and to make this collaboration more effective.

OBJECT OF THE INVENTION

The present invention aims to remedy all or part of these drawbacks.

To this end, according to a first aspect, the present invention is directed to a method for enriching digital content representative of a conversation, which comprises: in an iterative manner:
  a step of capturing an audio signal representative of a voice message,
  a step of segmenting the voice message into a segment, said segmentation step including a silence detection step, the segment being obtained as a function of the detection of a silence
  a step of converting the audio segment into text, called "contribution", and
  a step of storing, in a memory, a contribution,
then:
  a step of detecting a user's feeling towards at least one stored contribution
  a step of associating, in a memory and in relation to at least one stored contribution, at least one attribute corresponding to at least one detected sentiment, and
  a step of displaying at least one stored contribution and at least one attribute with respect to at least one said contribution.

With these arrangements, a set of propositions in a user's speech can be decomposed into segments, each segment being able to be associated with distinct sentiments expressed by numerical attributes. These numeric attributes allow the oral discussion to be digitally manipulatable by enriching its content.

In embodiments, the detection step comprises:
  a step of collecting an audio signal representative of a voice message emitted by a user and
  a step of determining a sentiment based on the collected audio signal.

These arrangements allow for automatic, real-time determination of a user's sentiment toward a contribution.

In embodiments, the detecting step comprises:
  a step of collecting a video signal representative of a user's attitude and
  a step of determining a sentiment based on the collected video signal.

These arrangements enable a user's sentiment toward a contribution to be determined automatically and in real time.

In embodiments, the detection step comprises:
  a step of selection by a user, via a human-machine interface, of a stored contribution and
  a step of selecting, by a user, via a man-machine interface, a symbol representative of a feeling towards the selected contribution.

These provisions allow a user to select from a set of attributes the one that best corresponds to a contribution.

In embodiments, the method of the present invention comprises:
  a step of automatically creating, according to a creation rule, a query based on at least one sentiment attribute associated with at least one stored contribution and/or at least one stored contribution and/or at least one captured audio signal,
  a step of providing, via a man-machine interface, the query to at least one user
  a step of detecting an action of at least one user with respect to the request and
  a step of carrying out a computer processing according to at least one detected action, according to a realization rule.

These embodiments allow for processing based on the stored contributions and attributes to be performed during or after the conversation.

In some embodiments, the creation rule is scalable, the method comprising a step of learning by reinforcing the rule according to at least one detected action with respect to the request.

These embodiments allow to optimize the triggering of the creation of a query.

In some embodiments, the realization rule is scalable, the method comprising a step of learning by reinforcement of the rule according to at least one action detected with respect to the request.

These embodiments allow to optimize the triggering of the execution of a treatment associated with a request.

In embodiments, the method subject to the present invention comprises:
  a step of probabilistically determining at least one attribute that is a candidate for association with a stored contribution,
  a step of validating or invalidating the determined association and a step of associating, in a memory, at least one attribute with a stored contribution in case of validation of the association.

In these embodiments, attributes can be added to a contribution, said attributes being, for example, other texts.

In embodiments, the method subject to the present invention comprises:
- a step of summarizing the discussion, based on at least one stored contribution and at least one attribute associated with said text and
- a step of storing the summarized discussion.

These embodiments allow compacting the contributions to keep those of significant importance.

According to a second aspect, the present invention is directed to a system for enriching digital content representative of a conversation, which comprises:
- at least one computer terminal, each computer terminal comprising:
- an audio sensor configured to pick up an audio signal representative of a voice message,
- a computing means configured to:
- detect silence in an audio stream captured by the sensor
- segment the voice message into at least one segment based on the detection of silence
- converting the voice message into text, called "contribution", and
- a computer memory for storing at least one contribution, the computing means of at least one said computer terminal being further configured to:
- detect a user's feeling towards the at least one stored contribution and
- associating, in the memory and in relation to the at least one stored contribution, at least one attribute corresponding to the at least one detected sentiment said computer terminal further comprising means for displaying at least one stored contribution and at least one indicator representative of a detected sentiment with respect to said at least one contribution.

Since the purposes, advantages and particular characteristics of the system that is the subject of the present invention are similar to those of the method that is the subject of the present invention, they are not recalled here.

BRIEF DESCRIPTION OF THE FIGURES

Further advantages, purposes and particular features of the invention will be apparent from the following non-limiting description of at least one particular embodiment of the system and method objects of the present invention, with reference to the appended drawings, in which:

FIG. 22 represents, schematically, a particular embodiment of a user interface implemented by the system that is the object of the present invention, FIG. 23 represents, schematically, a particular embodiment of a user interface implemented by the system that is the object of the present invention, FIG. 24 represents, schematically, a first embodiment of a user interface implemented by the system that is the object of the present invention.

DESCRIPTION OF EXAMPLE EMBODIMENTS OF THE INVENTION

The present description is given by way of non-limitation, as each feature of one embodiment may be combined with any other feature of any other embodiment in an advantageous manner.

It is noted at this point that the figures are not to scale.

Figure 30:
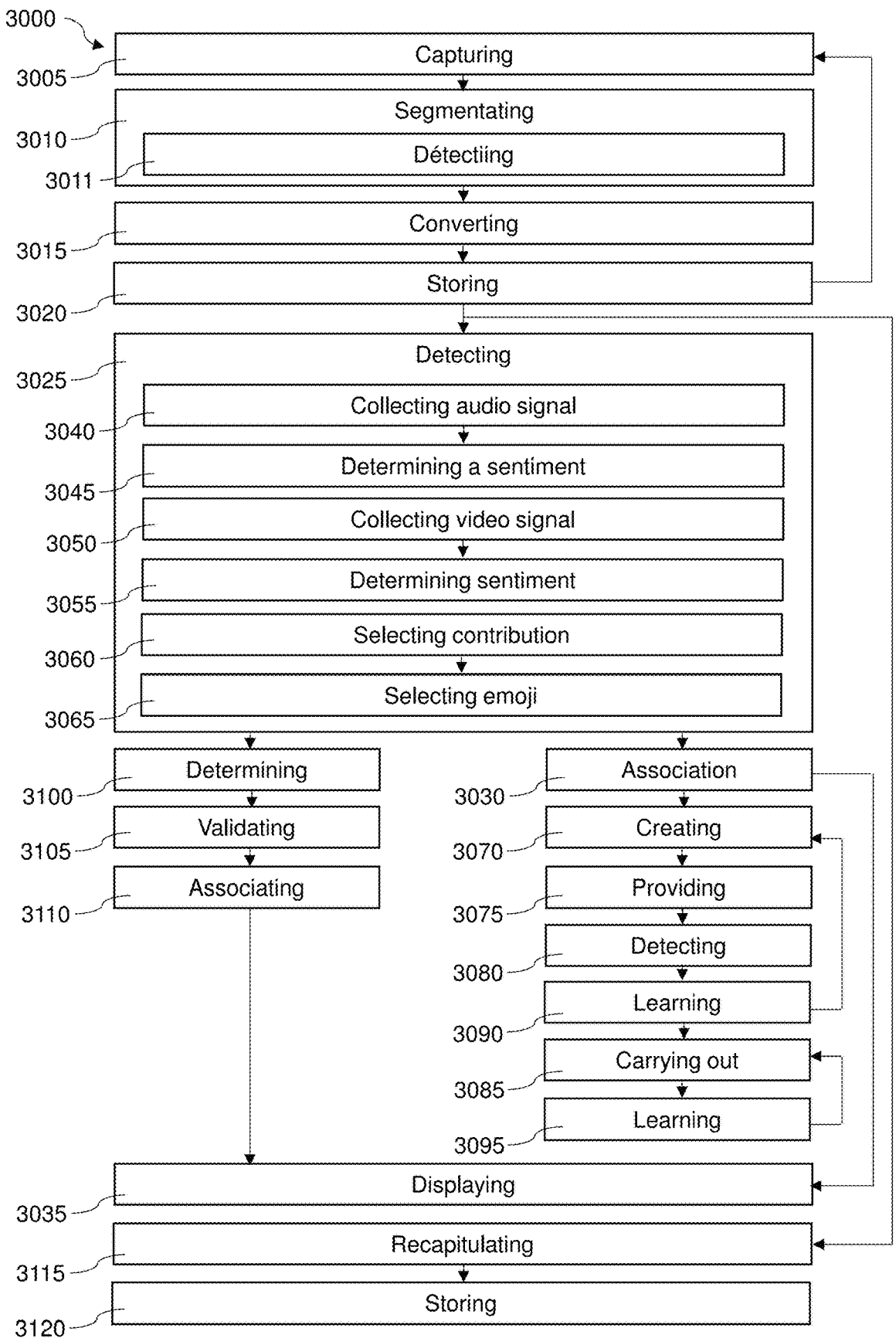
FIG. 30 shows, schematically, a sixth embodiment of a particular sequence of steps of the process of the present invention.

A particular embodiment of the process 3000 which is the subject of the present invention is schematically observed in FIG. 30. This process 3000 for enriching a digital content representative of a conversation, comprises:
in an iterative manner:
- a step 3005 of capturing an audio signal representative of a voice message,
- a step 3010 of segmenting the voice message into a segment, said segmentation step including a step 3011 of detecting silence, the segment being obtained as a function of the detection of silence
- a step 3015 of converting the audio segment into text, called "contribution", and
- a step 3020 of storing, in a memory, a contribution, then:
- a step 3025 of detecting user sentiment towards at least one stored contribution,
- a step 3030 of associating, in a memory and in relation to at least one stored contribution, at least one attribute corresponding to at least one detected sentiment and
- a step 3035 of displaying at least one stored contribution and at least one attribute with respect to at least one said contribution.

Figure 31:
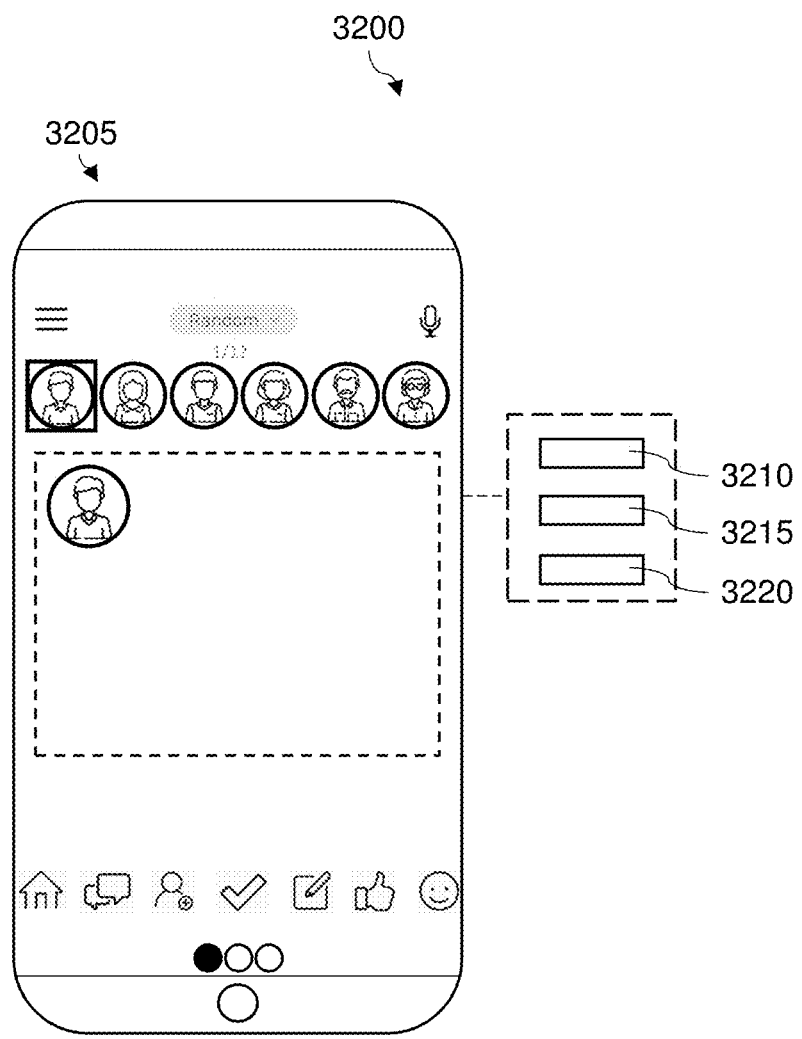
FIG. 31 represents, schematically, a particular embodiment of the system that is the object of the present invention.

The capture step 3005 is performed, for example, by implementing an audio sensor, such as a microphone, of a computer terminal 3205, as shown in FIG. 31. By "computer terminal" is meant here generally any electronic device comprising at least:
- an audio sensor 3210, such as a microphone, configured to pick up an audio signal representative of a voice message,
- a computing means 3215, such as a microprocessor, configured to:
- detect silence in an audio stream captured by the sensor,
- segment the voice message into at least one segment based on the detection of silence
- convert the voice message into text, referred to as "contribution", and
- a computer memory 3220 for storing at least one contribution, the computing means 3215 of at least one said computer terminal 3205 being further configured to:
- detect a user sentiment toward at least one stored contribution and
- associate, in memory and in relation to the at least one stored contribution, at least one attribute corresponding to the at least one detected sentiment, said computer terminal 3205 further including means for displaying, such as a screen, at least one stored contribution and at least one indicator representative of a detected sentiment with respect to said at least one contribution.

Such a computer terminal 3205 may be a smartphone, a digital tablet, or a computer. In distributed configurations, the computing means 3215 may be distributed between a local terminal and a remote terminal communicating via a data network, such as the internet for example. In such a configuration, each action can be performed by a separate computer program, with the results of the calculations being provided from one terminal to the other according to the needs of the selected architecture.

By "voice message" we mean a succession of words from a user.

At the end of the capture step, a computer file of finite size is obtained or captured in real time ("streamed").

Figure 26:
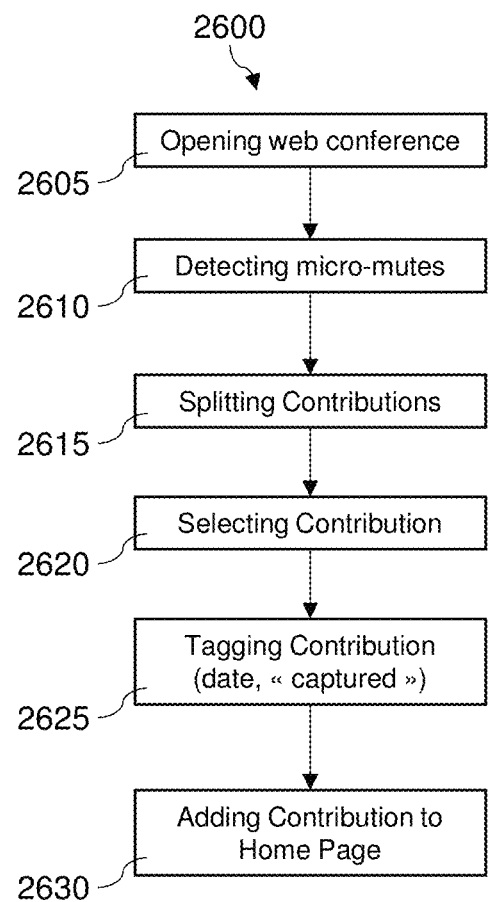
FIG. 26 represents, schematically, a second mode of implementation of a particular succession of steps of the process of the present invention.

Such a step 3005 is implicitly illustrated in FIG. 26, in particular in relation to the step 2605 of opening a web conference page.

The segmentation step 3010 is performed, for example, by the implementation of a computer program by an electronic computing means. This computer program is configured to, as a function of an event detected in the voice message, segment the voice message to extract a segment. Such an event is, for example, a silence.

Such a step 3010 is illustrated in FIG. 26, in particular in relation to the step 2615 of segmenting the users' dictation.

The step 3011 of detecting a silence is performed, for example, by the implementation of a computer program by an electronic computing means. Such a computer program uses, for example, the "Silence Finder" program developed by Audacity (Trademark). Such a step 3011 is illustrated in FIG. 26, in particular in relation to step 2610 of detecting micro-silences.

Thus, when a silence is detected, the voice message upstream of the silence is extracted to form a segment.

The conversion step 3015 is performed, for example, by implementing a computer program by an electronic computing means. Such a computer program is, for example, similar to iOS Dictation (Trademark). The result of these steps 3010, 3011 and 3015 can be seen in FIG. 7, for example, as references 710, 711 and 712 of segmenting and converting a voice conversation into text.

The storage step 3020 is performed, for example, by implementing a computer memory 3220 associated with a system for managing said memory 3220. Preferably, each stored contribution is time-stamped and associated with a user identifier, said user identifier corresponding to a user identifier of an application or terminal 3205 running an application performing the method.

The steps of capture 3005, segmentation 3010, silence detection 3011, conversion 3015, and storage 3020 may be iterative. These modes are particularly suitable for capturing live contributions. Alternatively, for a data capture step 3005, the segmentation 3010, silence detection 3011, conversion 3015 and storage 3020 steps are iterative.

Once at least one contribution is stored, the rest of the process 3000 can be performed.

The detection step 3025 may be performed in several ways depending on the detection method chosen.

In some embodiments, the detection 3025 is declarative. In these embodiments, the result of which is illustrated in FIG. 8, the detection step 3025 comprises:
- a step 3060 of selecting, by a user via a human-machine interface, a stored contribution and a step 3065 of selecting, by a user, via a man-machine interface, a symbol representative of a feeling towards the selected contribution.

The step 3060 of selecting a contribution is performed, for example, by clicking on a touch screen of the computer terminal 3205 to select a contribution.

The step 3065 of selecting a symbol is performed, for example, by clicking on a portion of the user interface of an application displaying the contribution allowing the selection of a symbol, such as an emoji, to be associated with the contribution.

Figure 8:
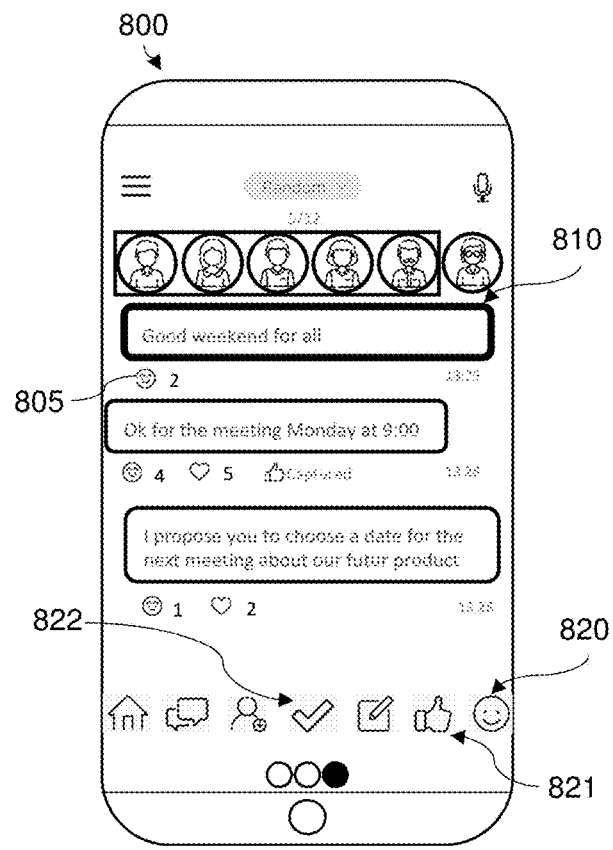
FIG. 8 shows, schematically, a particular embodiment of a user interface implemented by the system that is the subject of the present invention.

Such a step 3060 is illustrated in FIG. 8 under reference 810 representing a user-selected contribution.

Such a step 3065 is illustrated in FIG. 8 as reference 820 representing the selection of an emoji.

In embodiments, the detection 3025 is of an automatic type.

Figure 11:
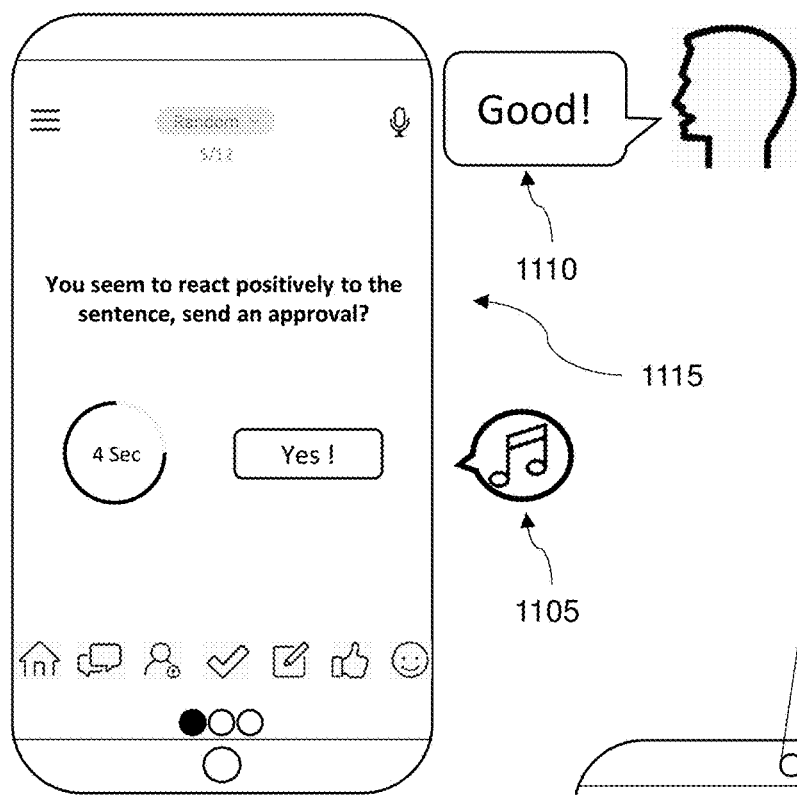
FIG. 11 represents, schematically, a particular embodiment of a user interface implemented by the system that is the object of the present invention.

In some embodiments, the result of which is illustrated in FIG. 11, a sentiment is detected based on a sound made by a user.

In these embodiments, the detection step 3025 comprises:
- a step 3040 of collecting an audio signal representative of a voice message emitted by a user,
- a step 3045 of determining a sentiment based on the collected audio signal.

The collection step 3040 is performed, for example, by using a microphone of a user's computer terminal 3205. Such a step 3040 is illustrated in FIG. 11, in particular in relation to step 1110 of detecting a voice message from the user.

The step 3045 of determining a sentiment is performed, for example, by implementing a computer program by an electronic computing means. This computer program is configured to detect sound signals representative of feelings, such as signals of approval, when the user says "yes" or of disapproval when the user says "no". Such a computer program is, for example, similar to Supersonic Fun Voice Messenger (Trademark).

This collection step 3040 may be concurrent with the voice message capture step 3005 performed for another user.

Figure 12:
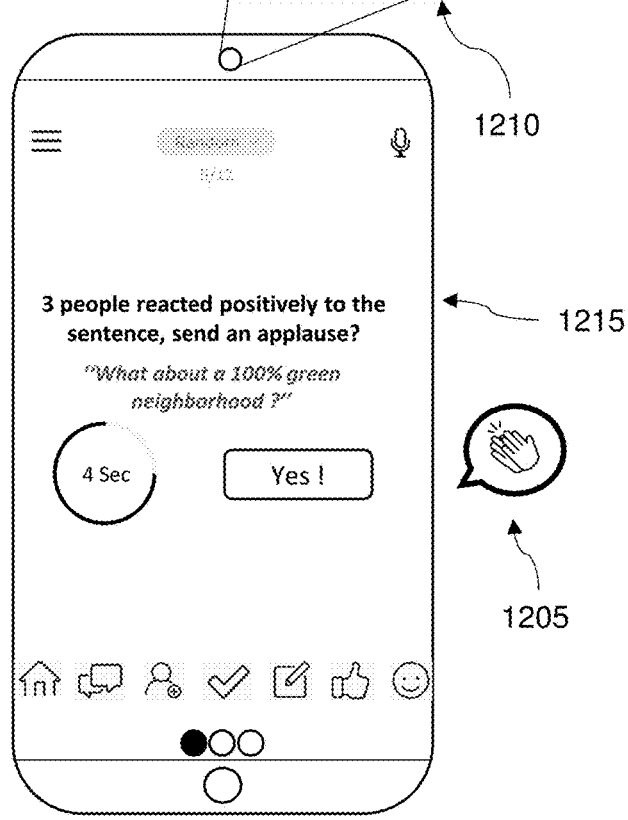
FIG. 12 shows, schematically, a particular embodiment of a user interface implemented by the system that is the object of the present invention.

In some embodiments, a sentiment is detected based on the detected body attitude of a user. In these embodiments, the result of which is illustrated in FIG. 12, the detection step 3025 comprises:
- a step 3050 of collecting a video signal representative of an attitude of a user,
- a step 3055 of determining a sentiment based on the collected video signal.

The collection step 3050 is performed, for example, by a cyber camera directed at a user of a computer terminal 3205 associated with the cyber camera. Such a step 3050 is illustrated in FIG. 12, particularly in connection with step 1210 of detecting a nod of the user's head.

The determination step 3055 is performed, for example, by implementing a computer program by an electronic computing means. This computer program is, for example, similar to Intel (Trademark) RealSense (Trademark) or OpenVINO (Trademark), and recognizes a bodily acquiescence as a nod or a smile.

Regardless of the method of determining a sentiment, that sentiment is converted to an attribute. An "attribute" is defined as metadata that enriches a contribution, and this attribute can be of any type. For example, the sound "yes" is associated with the attribute "acquiescence". Preferably, this attribute includes a type of sentiment and the user ID associated with the detected sentiment.

The memory association step 3030 is performed, for example, by implementing a computer memory 3220 associated with a management system for said memory 3220. This step 3030 is illustrated in FIG. 26 as reference 2625.

The display step 3035 is performed, for example, by implementing a computer terminal screen 3205 whose display is controlled based on the execution of an application requiring the display of at least one contribution and at least one attribute. This step 3035 is illustrated in FIG. 26 as reference 2630.

Figure 25:
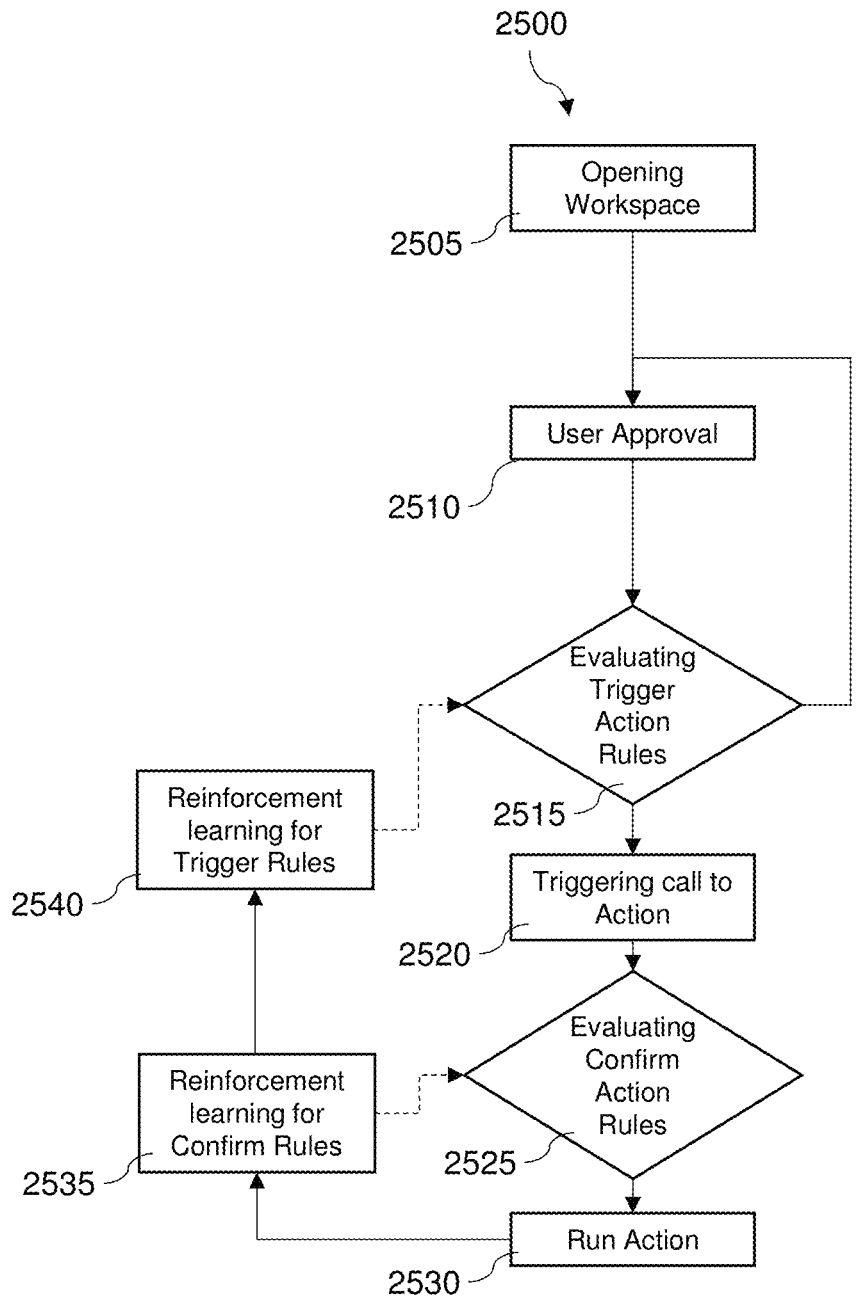
FIG. 25 shows, schematically, a first embodiment of a particular sequence of steps of the process of the present invention.

In embodiments, as illustrated in FIG. 25, the method 3000 subject of the present invention includes:
- a step 3070 of automatically creating, according to a creation rule, a query based on at least one sentiment attribute associated with at least one stored contribution and/or at least one stored contribution and/or at least one captured audio signal,
- a step 3075 of providing, via a human machine interface, the query to at least one user
- a step 3080 of detecting an action of at least one user with respect to the request and
- a step 3085 of carrying out a computer processing according to at least one detected action, according to a realization rule.

The step 3070 of automatic creation is performed, for example, by implementing a computer program by an electronic computing means. Such a computer program is, for example, similar to the "Create call to action" functionality available from a Facebook page (Trademark). This step 3070 is illustrated in FIG. 25 under reference 2515 of evaluating the conditions of the rules of actions. This step 3075 is illustrated in FIG. 25 as reference 2520 of triggering an action request from the user. This step 3080 is illustrated in FIG. 25 as reference 2525 of evaluating action confirmation rules. This step 3085 is illustrated in FIG. 25 as reference 2530 of performing an action.

A request may consist of soliciting users to validate a contribution, confirm a detected sentiment, register for a given service, vote in a consultation, launch an application, etc.

A creation rule is defined by a criterion and a threshold triggering the creation step 3070. For example, the rule may consist of the association of a determined number of sentiment attributes with respect to a determined contribution or the association of a determined number of sentiment attributes over a given period. Preferably, the query created depends on the content of the contribution. The content of a contribution can be identified by a text analysis computer program ("parsing") configured to prioritize the identified text, such as Zapier Parser (trademark) or Mailparser.io (trademark).

The creation rule may be scalable, the method 3000 then including a step 3090 of learning by reinforcing the rule according to at least one action detected with respect to the query. This step 3090 is illustrated in FIG. 25 under the reference 2540 of reinforcement of the request initiation rule.

The learning step 3090 implements a statistical algorithm configured to evaluate the relevance of query creation based on actions detected with respect to past queries. Such a step 3090 is well known and consists in the multi-criteria evaluation of the success or failure of queries, determined according to the responses to the queries to weight each criterion used in the creation of queries. Such a learning program implements, for example, Azure Machine Learning Services (Trademark), Azure Machine Learning Command-Line Interface (Trademark) or Main Python SDK (Trademark).

The step 3075 of providing is performed, for example, by displaying on the screen of a terminal 3205 of at least one user a window representative of the query and requesting an action from the user. This action depends on the request and the interactive elements displayed in the window, the nature, quantity and meaning of which depend on the request.

The step 3080 of detecting an action is performed, for example, by detecting an action performed by the user with respect to the request provided. This action can be of the gestural type and detected by the implementation of a touch screen, for example. The detection 3080 of an action thus depends on the supply method and the action requested from the user.

In general, the detection 3080 of an action implements a human-machine interface to detect a user interaction with the provided request. This interface may be a cyber camera, a keyboard or mouse type device, or a touch screen.

Figure 10:
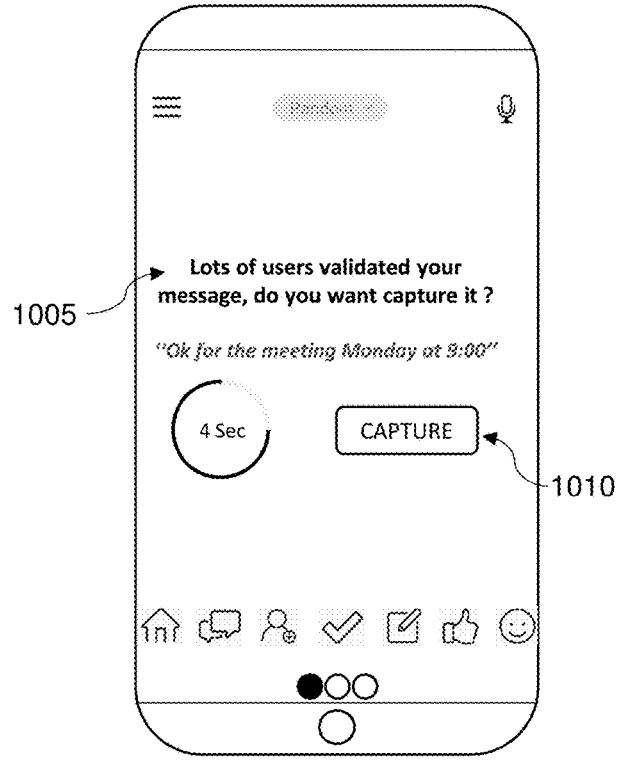
FIG. 10 shows, schematically, a particular embodiment of a user interface implemented by the system that is the subject of the present invention.

The step 3085 of performing a computer processing is performed, for example, by implementing a computer program by an electronic computing means. The computer processing depends on the request and may consist, for example, of adding an automatically generated contribution from among the contributions obtained via the capture of voice messages. The computer processing may also, for example, consist of launching a computer program. This step 3075 is illustrated in FIG. 10 as a request 1005 for a user action. This step 3080 is illustrated in FIG. 10 as user action reference 1010. In embodiments, as illustrated in FIG. 25, the implementation rule is scalable, the method 3000 then including a step 3095 of learning by reinforcing the rule as a function of at least one action detected with respect to the request. This step 3095 is illustrated in FIG. 25 as reference 2535 for reinforcing the query confirmation rule.

In embodiments, as illustrated in FIG. 24, the method 3000 subject of the present invention includes:
- a step 3100 of probabilistically determining at least one candidate attribute for association with a stored contribution,
- a step 3105 of validating or invalidating the determined association and
- a step 3110 of associating, in a memory, at least one attribute with a stored contribution in case of validation of the association.

The probabilistic determination step 3100 is performed, for example, by implementing a computer program by an electronic computing means. This computer program analyzes the textual content of a contribution to determine the relevance of at least one complementary keyword or attribute.

Each complementary attribute, or keyword, is then displayed on an interface of the computer program and awaits processing by the user.

The validation step 3105 is performed, for example, by implementing a human-machine interface whose use is representative of an intention to validate or invalidate the determined association. For example, the user may scan the touch screen in a first direction to validate the association or in a second direction to invalidate the association.

The association step 3110 is performed in an analogous way to the step 3030 of associating an attribute representative of a sentiment with a contribution. This step 3100 is illustrated in FIG. 24 under the references 2410 to 2413 of probabilistic determination of candidate attributes for an association ("pictures", "church", "wedding cake", "gift"). This step 3105 is illustrated in FIG. 24 under reference 2420 of validating this association by a scan. This step 3110 is illustrated in FIG. 24 under reference 2430 of associating an attribute ("pictures") and a contribution, the association being represented by the integration of a pictogram in the bubble.

Figure 15:
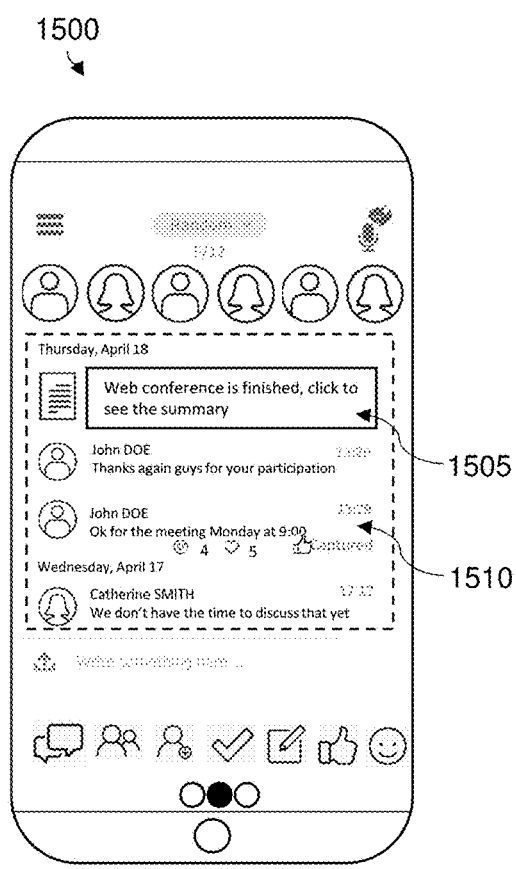
FIG. 15 shows, schematically, a particular embodiment of a user interface implemented by the system that is the object of the present invention.

In embodiments, as illustrated in FIG. 15, the method 3000 subject of the present invention comprises:
- a step 3115 of summarizing the discussion, based on at least one stored contribution and at least one attribute associated with said text and
- a step 3120 of storing the summarized discussion.

The recapitulation step 3115 is performed, for example, by implementing a computer program for recapitulating a textual content, by an electronic computing means. This computer program implements, for example, Python's NLTK library (Trademark). This step 3115 is illustrated in FIG. 15 under the session summary reference 1505.

The storage step 3120 is performed, for example, by implementing a memory and the associated control device.

A particular embodiment of the system 3200 that is the subject of the present invention is observed in FIG. 31. This system 3200 for enriching a digital content representative of a conversation, comprises:
- at least one computer terminal 3205, each computer terminal including:
  - an audio sensor 3210 configured to capture an audio signal representative of a voice message,
  - a computing means 3215 configured to:
    - detect silence in an audio stream captured by the sensor,
    - segment the voice message into at least one segment based on the detection of silence
    - converting the voice message into text, referred to as "contribution", and
  - a computer memory 3220 for storing at least one contribution,
- the computing means of at least one said computer terminal being further configured to:
  - detect a user sentiment toward at least one stored contribution, and
  - associating, in the memory and in relation to the at least one stored contribution, at least one attribute corresponding to the at least one detected sentiment said computer terminal further comprising means for displaying at least one stored contribution and at least one indicator representative of a detected sentiment with respect to said at least one contribution. Preferably, the system 3200 implements a plurality of computer terminals connected by a data network, such as the Internet or a fourth or fifth generation mobile network for example.

As previously indicated, each computer terminal 3205 may be distributed between a remote computing server and a local application, i.e., as close as possible to a user, linked together by a data network.

Observed functionally, i.e., without presupposition of where a computer algorithm is executed, the system 3200 may include:
- a social network management application that references:
- a set of users corresponding to terminals. These users are each characterized by an avatar and grouped by sets,
- a set of virtual workspaces characterized by a name, a theme and a set of users. The users of a virtual workspace are divided into subsets that are registered (list of members) and connected (list of connected users). A virtual workspace includes a discussion thread, populated by user contributions and actions. A virtual workspace is represented by three main pages: a home page, a member page and a text summary page from a voice message and a set of contributions each attached to a virtual workspace, characterized by an author, a timestamp and a text, the latter being dictated orally by a user thanks to the text synthesis application;

the text-to-speech application transcribes a user's dictation into text, such as iOS Dictation (trademark). In addition, it cooperates with a silence detection application such as Audacity Silence Finder (trademark), to segment this dictation into as many contributions. Each contribution is time-stamped and accompanied by its author's ID;

a Unified Collaboration Platform application, such as Slack (Trademark), Microsoft Team (Trademark), Workplace by Facebook (Trademark), managing in particular the discussion channels attached to virtual workspaces, and making the following applications cooperate a web conferencing application, such as Skype for Business Meeting (Trademark), Amazon Chime (Trademark), Google Hangouts Meet (Trademark), IBM Sametime (Trademark), Skype Enterprise (Trademark). This application allows you to organize audio, video and web conferences over the Internet, schedule a meeting in advance, start one at any time and invite users, a silence detection application such as the Silence Finder feature used by Audacity (trademark), a speech recognition application, such as Supersonic Fun Voice Messenger (Trademark), recognizes a set of meaningful phrases, e.g. an oral acquiescence: "yes", "great", "well" or "of course" or the end of an internet conference: "thank you for your participation", a sentiment recognition application, such as Intel (Trademark) RealSense (Trademark) or OpenVINO (Trademark), which recognizes a bodily acknowledgement such as a head nod or a smile, a call to action application, such as the "Create call to action" feature accessible from a Facebook page (Trademark), which allows to solicit a user's action, in a predefined list of Actions, such as validate, confirm, register, vote, launch an app, etc, a sound emoji application, such as Emojisound (Trademark) or Emoji Tones (Trademark), which allows to play a sound representing an emotion, a reinforcement learning application, such as Azure Machine Learning Service (Trademark), Azure Machine Learning Command-Line Interface (Trademark) or Main Python SDK (Trademark), an automatic summarization application, such as Python's NLTK library (Trademark) and/or a parser application.

FIGS. 1 to 24 show particular views of an interface of an application allowing the execution of the process 3000 of the present invention.

In this interface, we observe a member page 100 in which is displayed from top to bottom:

a menu pictogram 105, a text area 110 representing the name of the virtual workspace, a pictogram 115 indicating the activity of the smartphone microphone (here deactivated), a set 120 of avatars representing in a scrolling banner the users registered in the virtual workspace a subset 125 of avatars representing a single user connected to the virtual workspace, framed in the drop-down banner and displayed in the voice area 130 and a set 135 of buttons that can be activated by the user and triggering certain functionalities.

Figure 1:
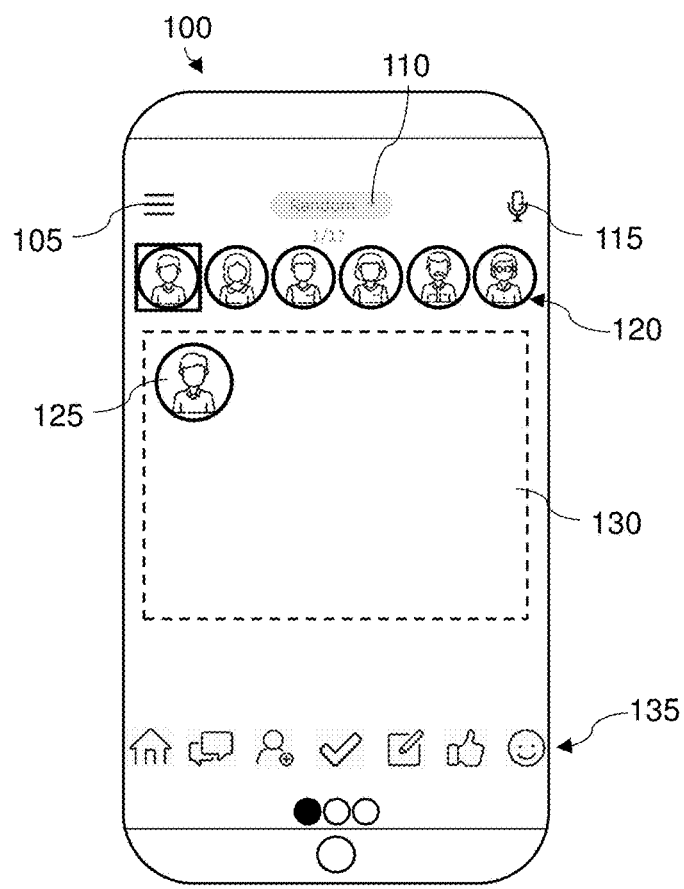
FIG. 1 represents, schematically, a particular embodiment of a user interface implemented by the system that is the subject of the present invention.
Figure 2:
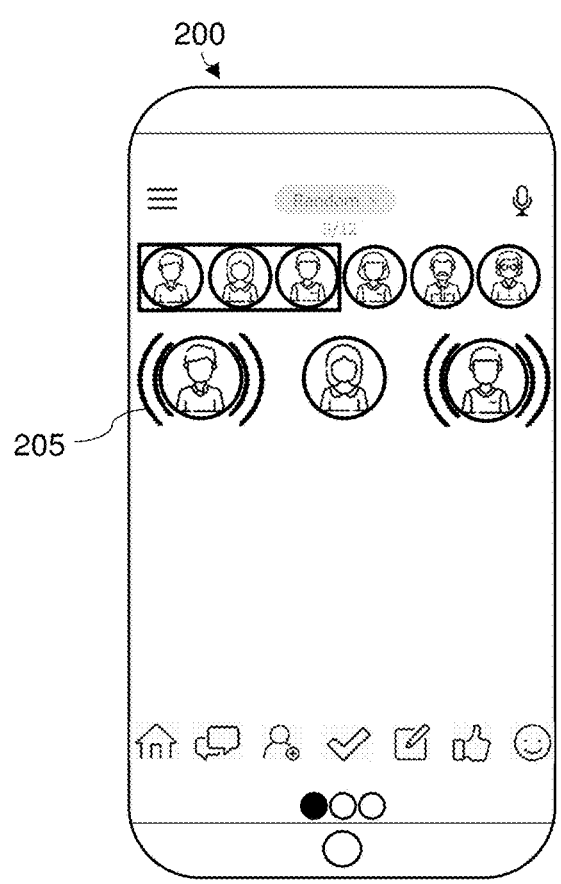
FIG. 2 represents, schematically, a particular embodiment of a user interface implemented by the system that is the subject of the present invention.

In FIG. 2, we observe the member page 200, in which is displayed:

a pictogram indicating the activity of the phone's microphone (here, activated) and a subset of avatars representing three users in the virtual space, the display of these avatars in the voice area being highlighted by a halo 205 when the corresponding users are speaking, i.e. whose voice status is activated.

Figure 3:
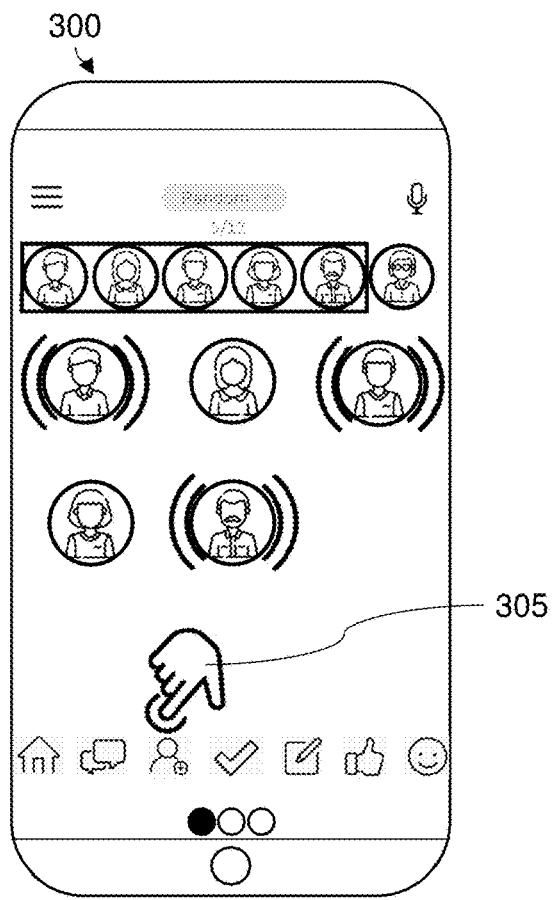
FIG. 3 represents, schematically, a particular embodiment of a user interface implemented by the system that is the object of the present invention.

In FIG. 3, we observe the member page 300, in which is displayed:

a subset of avatars representing five users connected to the virtual workspace and the activation by the user of an invitation button 305, which causes the invitation of registered, but not logged in, users through a virtual conference application.

Figure 4:
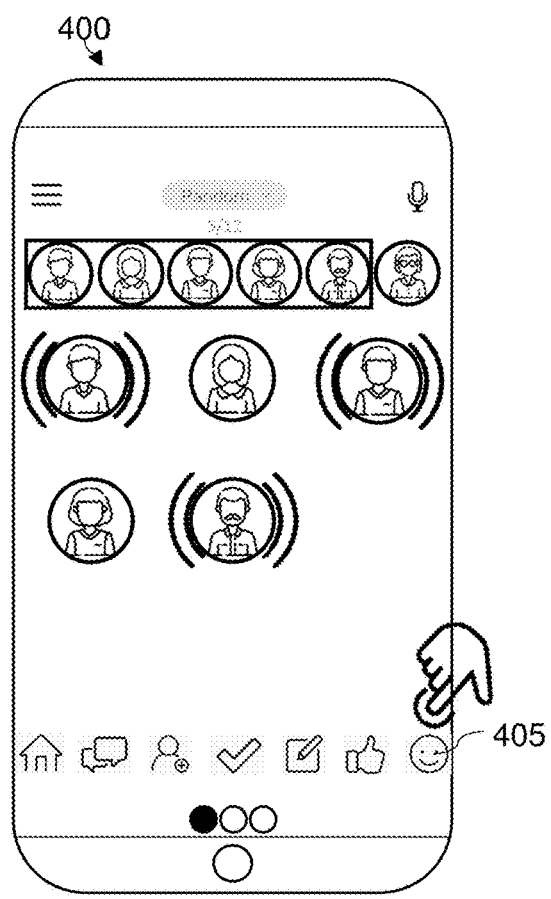
FIG. 4 represents, schematically, a particular embodiment of a user interface implemented by the system that is the object of the present invention.

In FIG. 4, we observe the members page 400 in which an emoji button 405 is displayed among the set of buttons. When activated by the user, this emoji button provides access to a menu allowing a user to select a particular emoji from a list.

Figure 5:
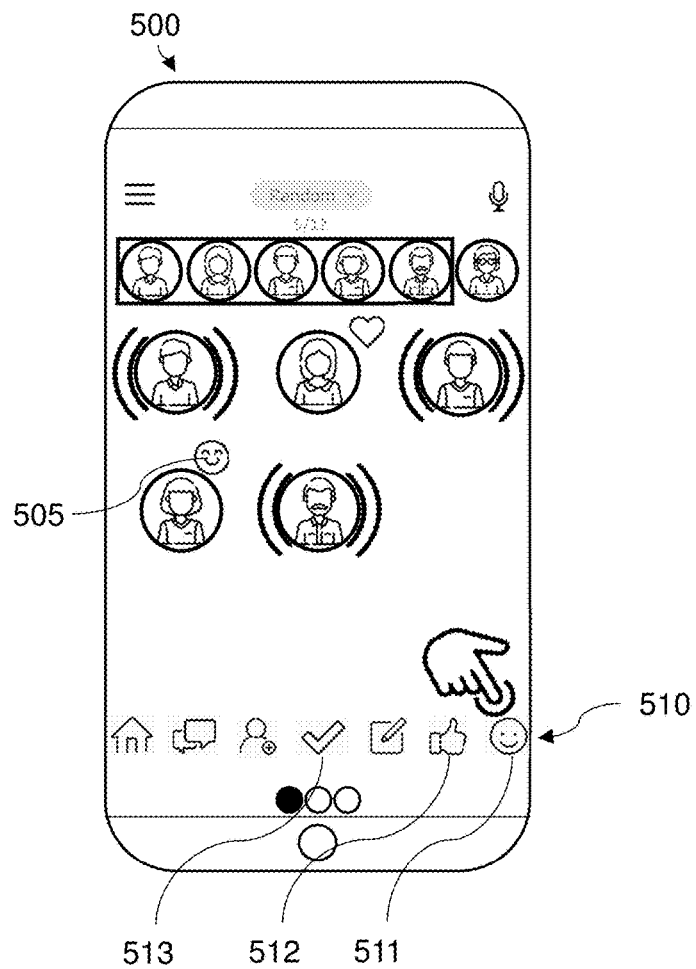
FIG. 5 represents, schematically, a particular embodiment of a user interface implemented by the system that is the object of the present invention.

In FIG. 5, a member page 500 is observed in which an attribute 505 representative of a feeling of approval, referred to as an approval attribute, is displayed near certain avatars in the voice area. This display is caused by the activation of approval buttons 510, including emoji buttons 511, capture buttons 512, and validation buttons 513.

Once a user has activated an emoji button 511 and selected a particular smiley face from a context menu, the approval attribute of the user's avatar replicates that emoji 505 until the voice status of the user being spoken changes from on to off. If more than one person is speaking, the approval attribute turns off after the last switch from on to off of the corresponding voice statuses.

Figure 6:
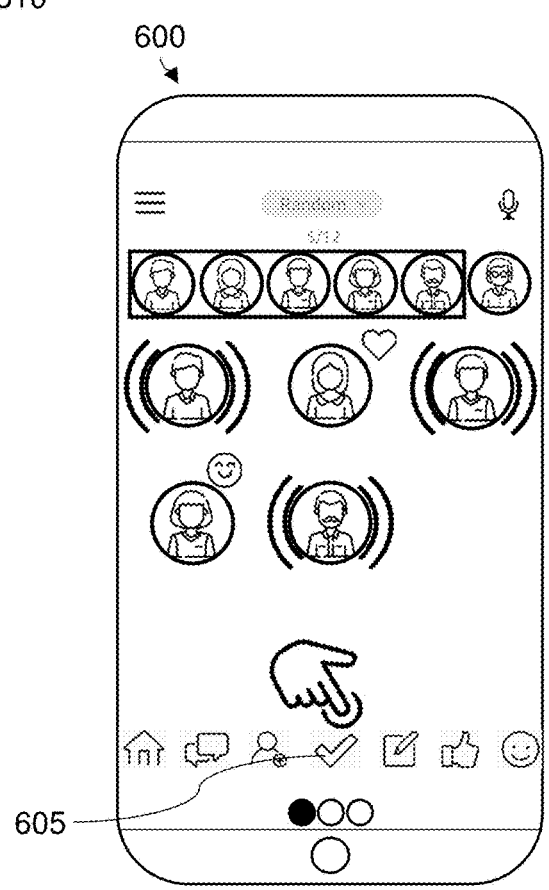
FIG. 6 represents, schematically, a particular embodiment of a user interface implemented by the system that is the object of the present invention.

In FIG. 6, it is observed on the member page 600 that when a user has activated an approval button 605, the speech recognition application is executed to recognize a voice acquiescence 1110 such as "great," "fine," "obviously," and the sentiment recognition application is executed to recognize a body acquiescence such as a head nod 1210. These acquiescences activate the corresponding sentiment attributes.

Once a user has activated the capture button, the approval attribute of the user's avatar replicates the "in capture" pictogram until the user's voice status while speaking changes from on to off. This "being captured" icon can also be displayed using the method described below. To do this, the user first activates the text-to-speech button, which activates the text-to-speech page of the audio message.

Figure 7:
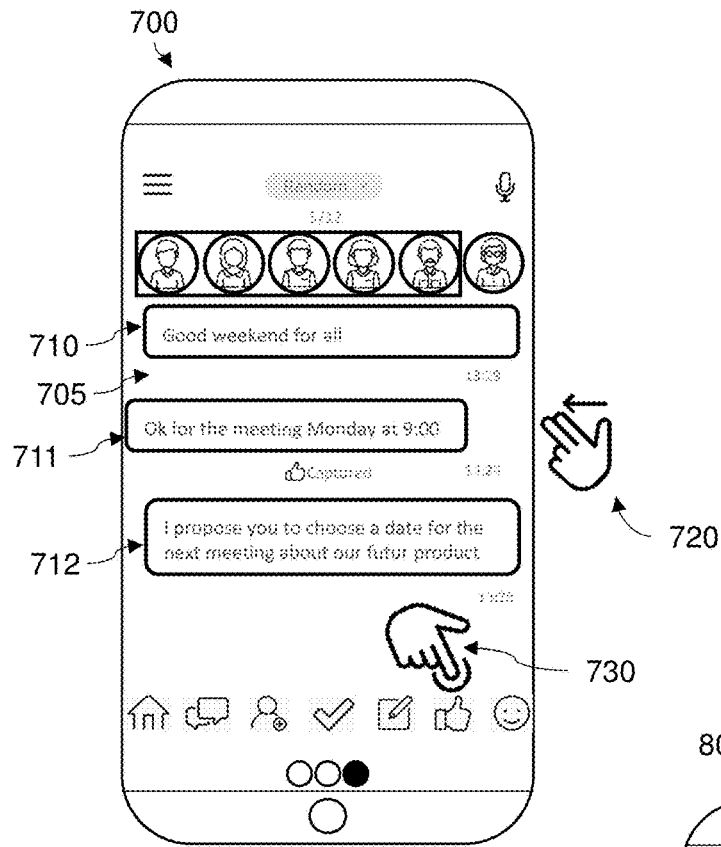
FIG. 7 shows, schematically, a particular embodiment of a user interface implemented by the system that is the subject of the present invention.

In FIG. 7, we observe a particular interface 700 of the textual synthesis page in which we display from top to bottom:

a menu pictogram, a text area representing the name of the virtual workspace, a pictogram indicating the activity of the terminal microphone displaying the interface, a set of avatars representing the users registered in the virtual workspace, a subset of avatars representing the connected users, i.e. the users connected to the virtual workspace a succession 705 of text bubbles 710 to 712 and pictograms representing respectively the contributions and the captures of the discussion thread of the virtual workspace and a set of buttons that can be activated by the user.

When the text summary page is displayed, the user can:
save a contribution through the text-to-speech application,
activate one of the buttons,
capture a contribution represented by a text bubble:
by activating the capture button, which causes the text bubble being created to be captured or
by dragging from right to left on a text bubble.

When a contribution is captured, the pictogram "in progress" is displayed:
near the corresponding text bubble in the text summary page and/or
near the author's avatar on the members' page.

In general, the approval of a user's dictation while speaking can be signified by other users through the activation of different approval buttons, such as the emoji, capture and validation buttons.

In FIG. 8, we see the text-to-speech page interface 800, in which each speech bubble has an approval counter 805. These approval counters count the number of activations of approval buttons 820 through 822 during the corresponding dictation. The activation of the home button causes the home page to be opened.

Figure 9:
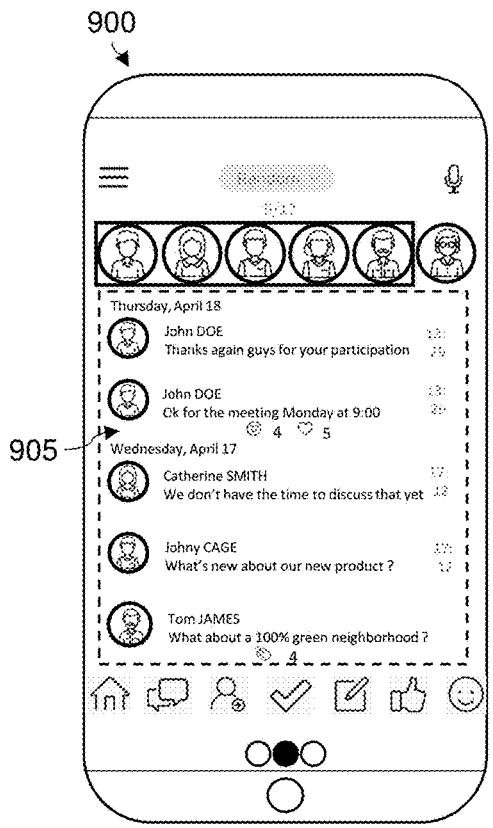
FIG. 9 shows, schematically, a particular embodiment of a user interface implemented by the system that is the subject of the present invention.

FIG. 9 shows the 900 home page. This home page displays the same groups of avatars and buttons as in the text-to-speech page. It also displays a discussion channel that lists all the contributions of the summary page that have been previously captured. Each contribution has an associated timestamp, author avatar and approval counters.

Approval counters are associated with predefined approval thresholds. When the level of an approval counter reaches one of the associated approval thresholds, this triggers a call to action through the implementation of the call to action application executing the action rules.

An example of a call to action interface and response to this call to action is shown in FIGS. 10 to 15. In these interfaces, the call-to-action application executes an action rule from the approval buttons:
if an approval counter reaches the predefined approval threshold, then,
the author of the speech bubble with which this approval counter is associated will see a call to action displayed on his terminal to confirm,
a call-to-action timer measures the speed of the confirmation,
a call-to-action counter measures the confirmation rate and
this action is executed on confirmation.

The first action rule is described with reference to FIG. 10, and consists of two parts:
the trigger 1005 of an action rule:
the approval threshold corresponds to ten activations of approval buttons by participants and
the call to action proposes, to the user who is speaking, to capture the text bubble whose approval counter has reached the value of the approval threshold, i.e. ten,
the 1010 confirmation of an action rule: if the user's confirmation is done before a defined expiration time, for example four seconds, the capture is done. The call-to-action counter is incremented and the call-to-action timer updates the average confirmation time.

The second action rule is described with reference to FIG. 11. Its objective is to stimulate a second mode of participation: "You and the others seem to have a positive opinion about what has just been said, do you want to be the first to express it? In concrete terms:
triggering an action rule:
the approval threshold corresponds to an activation of the validation button and
the call to action proposes, to the user who has activated this validation button, to execute a sound emoji like a bell,
the confirmation of an action rule: if the user's confirmation has been carried out before a predefined expiry time, the sound emoji 1105 is played in the conference. The call-to-action counter is incremented and the call-to-action timer recalculates the average confirmation time.

The third action rule is described with reference to FIG. 12. Its purpose is to stimulate a third mode of participation: "You are not alone in approving, do you join the approval?". In concrete terms:
the triggering of an action rule:
the approval threshold corresponds to the activation of three bell-like sound emojis by participants and
the call to action proposes, to these participants, to execute a sound emoji of the applause type
the confirmation of an action rule: if the confirmation by one of these participants has been done before a predefined expiration time, the 1205 sound emoji is played in the conference. The call-to-action counter is incremented and the call-to-action timer recalculates the average confirmation time.

The fourth action rule is described with reference to FIG. 13. Its purpose is to stimulate a fourth mode of participation: "Do you want to be part of the general enthusiasm related to the sentence?". In concrete terms:
the triggering of an action rule:
the approval threshold corresponds to the activation of applause-type sound emojis by more than 50% of the participants and
the call to action is a proposal to these participants to execute a sound emoji of the ovation type,
confirmation of an action rule: if the confirmation by 20% of these participants has been achieved before a predefined expiration time, the sound emoji is played in the conference. The call-to-action counter is incremented and the call-to-action timer recalculates the average confirmation time.

The action rules are preferentially organized in a hierarchical manner, as a standing ovation sound emoji follows a clap and a bell. This allows talking users and other connected users to intuitively understand the quality of contributions. This instruments the collaboration for real-time interactions, and enriches the conference report with a time-stamped indicator of group dynamics.

The action rules are modified through a two-level learning loop implemented by the reinforcement learning application. Action rules are indeed rewarded or penalized by the speed and rate of confirmation measured by call-to-action counters and call-to-action timers respectively.

Figure 13:
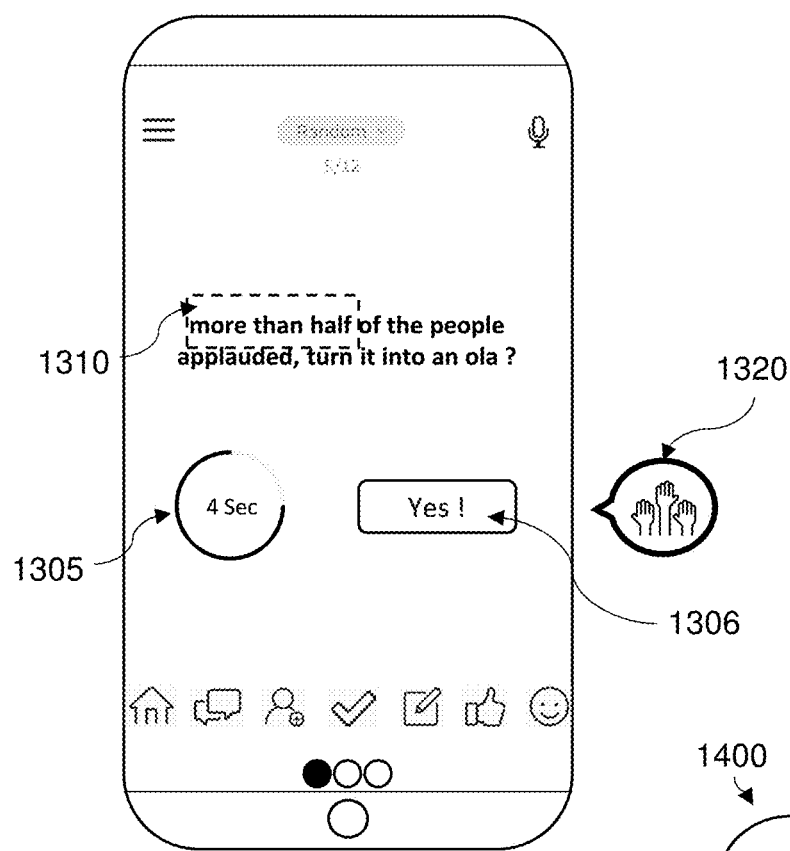
FIG. 13 shows, schematically, a particular embodiment of a user interface implemented by the system that is the object of the present invention.

With reference to FIG. 13, for example, the first level concerns the triggers of action rules, i.e. the conditions for triggering a call to action:
if the fourth action rule is often confirmed, according to the call-to-action counter measurement, the approval threshold is decremented, i.e., its value drops from 50% to 40% of the participants and
if the fourth action rule is rarely confirmed, the approval threshold is incremented, i.e. its value increases from 50% to 60% of the participants.

The second level concerns action rule confirmations, i.e. the conditions for confirming the call to action:

if the call to action is confirmed late, as measured by the call to action timer, the expiration time counter 1305 is increased by four to five seconds and if the call to action is confirmed early, the expiration time counter is decreased by four to three seconds. These embodiments of FIGS. 10 through 13 thus illustrate a method for, based on user-activated validation buttons, initiating and then confirming an action pursuant to a predefined action rule. Measuring the speed and rate of confirmation adjusts this action rule by learning.

In other embodiments, the learning loop may implement other metrics to measure the success or initiation of the action rules.

In FIGS. 10-13, action rules implementing an approval threshold and a single button 1306 for confirming the call to action were described. Alternatively, the initiation and confirmation of the call to action may be different, as illustrated in FIGS. 14 and 15.

Figure 14:
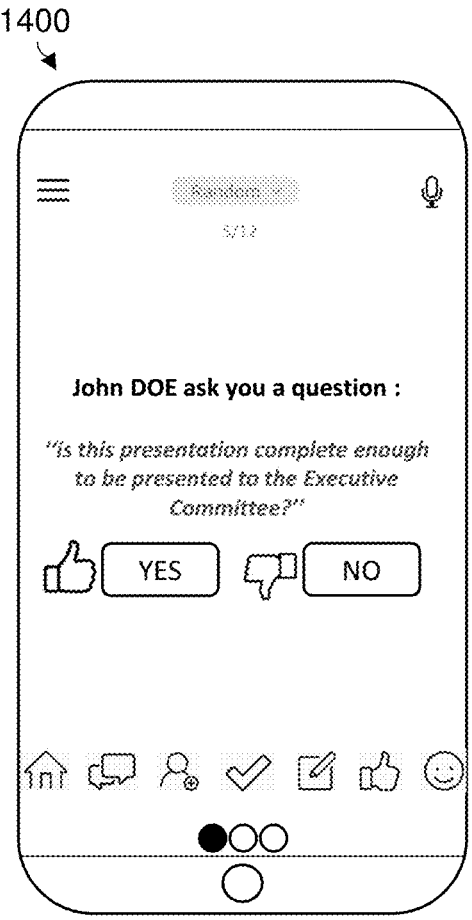
FIG. 14 shows, schematically, a particular embodiment of a user interface implemented by the system that is the object of the present invention.

With reference to FIG. 14, the call-to-action application 1400 executes the following action rule:

triggering an action rule:
if the text-to-speech application detects an interrogative form, and
the author of the question bubble captures it, then the text of this text bubble is displayed in a call to action to all connected users who are asked to confirm this question, the confirmation of an action rule: individual confirmation is acquired by the activation of a button, or by an oral or bodily acquiescence and collective confirmation is acquired if the number of individual confirmations represents more than half of the participants.

With reference to FIG. 15, the call-to-action application 1500 executes the following action rule:

triggering an action rule:
if the speech recognition application recognizes a locution signifying the end of an internet conference and
the author of this phrase captures the corresponding speech bubble, then the call-to-action application launches a call-to-action on the author's terminal to confirm the closure, the confirmation of an action rule: this validation causes the closing of the internet conference and the opening of the 1505 summary application. This application creates a summary of the session, i.e., a text file that compiles all of the captured text bubbles, their authors and timestamps, the associated approval counters, the agenda items that were not discussed and the learning loop regulates the frequency of sending the call to action according to the speed and frequency of confirmation by this author.

In relation to FIGS. 16 to 19, we observe interfaces forming assistance tools allowing users to inform a business process during a conference on the Internet by adding attributes to the contributions.

Figure 16:
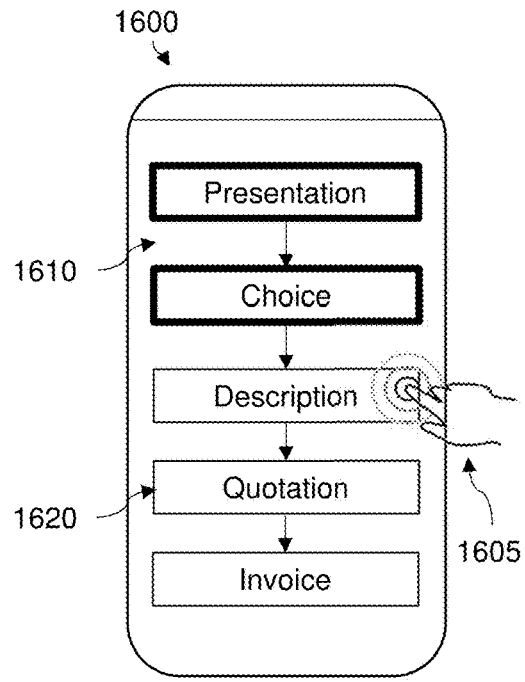
FIG. 16 shows, schematically, a particular embodiment of a user interface implemented by the system that is the object of the present invention.

With reference to FIG. 16, the virtual workspace 1600 further contains a business process page. On this page is displayed a business process representing a sequence of collaboration between a supplier and a customer. This sequence is accompanied by a business process counter that represents the progress of this sequence. Steps already completed are represented by a thick line. The activation 1605 of a step by the user ("description") causes:

the opening of the textual synthesis page and
the display of the identifier ("description") of this step in the textual synthesis page.

Figure 17:
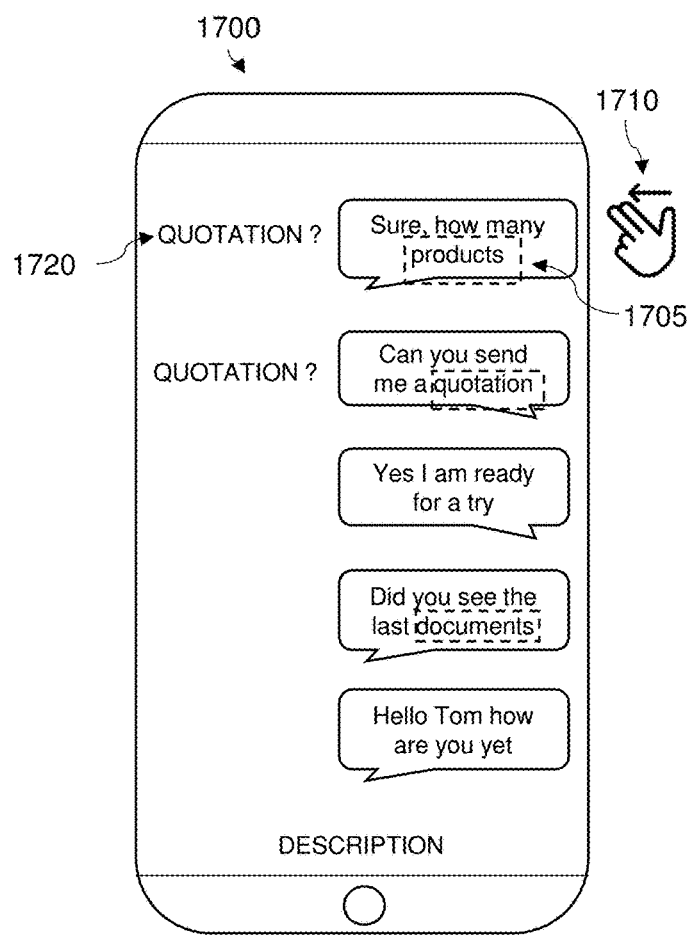
FIG. 17 shows, schematically, a particular embodiment of a user interface implemented by the system that is the object of the present invention.

With reference to FIG. 17, the textual synthesis page 1700 launches the parser to detect the key words 1705 and locutions revealing the steps of the business process.

This detection is achieved through associations between keywords and steps. The keyword "documents" is associated with the "description" step, while the keywords and phrases "quote" and "how many products" are associated with the "quote" step.

When a keyword does not correspond to the current step, this detection causes the display of an attribute opposite the text bubble concerned. This attribute represents the step corresponding to the keyword ("estimate").

The user can establish a link in memory between the attribute, or the step, and a contribution represented by the text bubble by performing a scan 1710 of this text bubble during this step.

The associations between keywords and steps are initialized by a first predefined set of associations between lexicon keywords and text bubble attributes. This lexicon is enriched by the user, as described below. These associations are strengthened or weakened through the application of reinforcement learning and link scans performed by all users.

Figure 18:
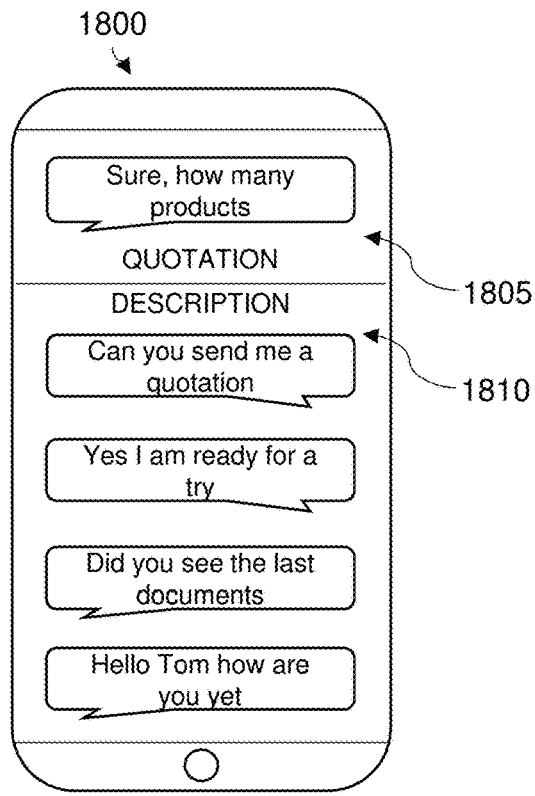
FIG. 18 shows, schematically, a particular embodiment of a user interface implemented by the system that is the object of the present invention.

With reference to FIG. 18, the text summarization page 1800 displays a dividing line between two successive text bubbles in application of the link(s) made by the user, to symbolize the transition between two steps, 1805 and 1810, of the business process.

Figure 19:
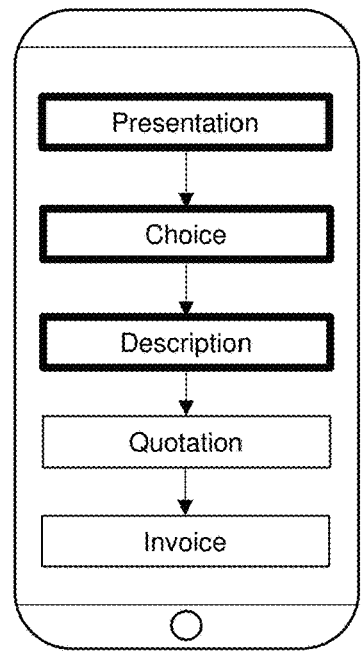
FIG. 19 shows, schematically, a particular embodiment of a user interface implemented by the system that is the object of the present invention.

With reference to FIG. 19, a scan command causes the business process counter to increment, thereby updating the progress representation on the business process page.

With reference to FIGS. 20 through 24, assistance tools allow users to provide additional information to enhance an ongoing web conference.

Figure 20:
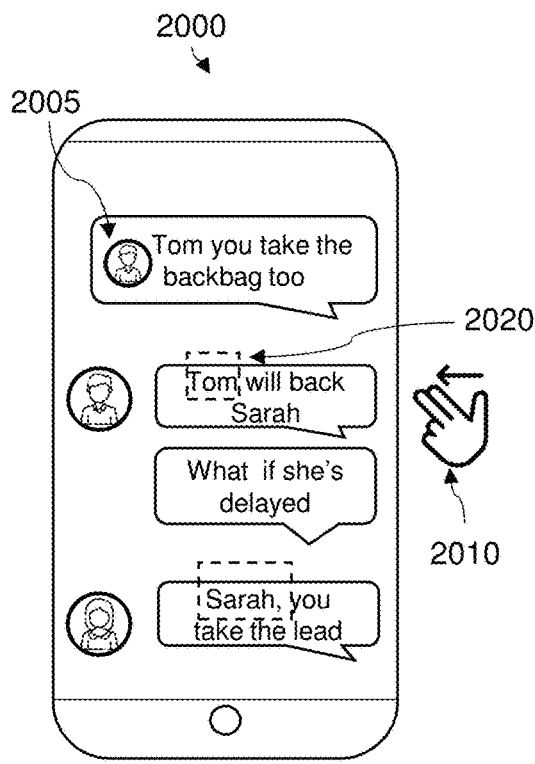
FIG. 20 shows, schematically, a particular embodiment of a user interface implemented by the system that is the object of the present invention.

With reference to FIG. 20, the text-to-speech page 2000 launches the parser to detect phrases that may reveal the identity of team members associated with the business process.

The text-to-speech page displays an attribute 2005 representing that identity, such as an avatar, associated with the relevant text bubble. A 2010 scan by the user on this text bubble causes the linking of this attribute and this text bubble, i.e. the represented contribution. This linking is represented by the display of this attribute inside the text bubble.

Figure 21:
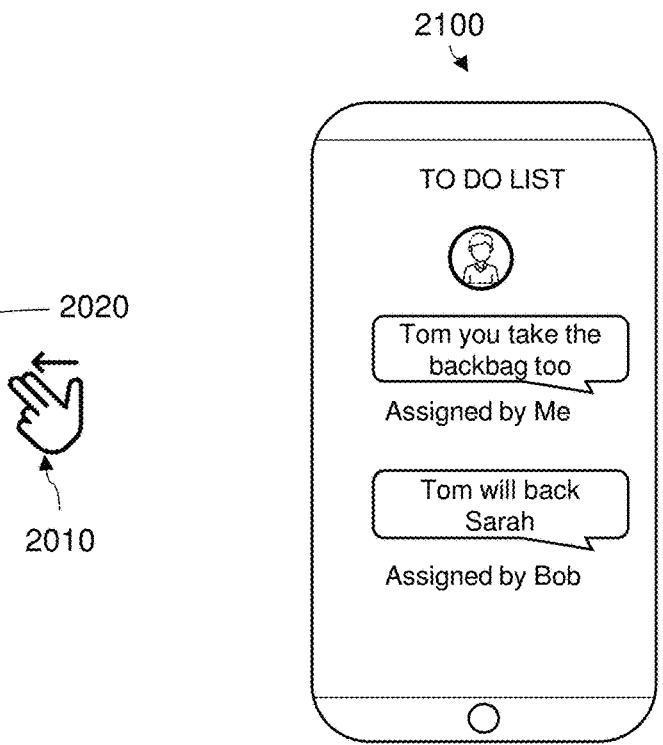
FIG. 21 shows, schematically, a particular embodiment of a user interface implemented by the system that is the subject of the present invention.

With reference to FIG. 21, the virtual workspace also contains a page 2100 of tasks to be performed. On this page is displayed per team member associated with the business process the list of text bubbles that have been associated with his identity, and by which user ("assigned by").

With reference to FIG. 22, the parser detects expressions that may reveal the tasks 2205 and objects 2210 associated with the business process.

The text-to-speech page displays an attribute 2215 representing a task or object, such as a pictogram, opposite the relevant text bubble. A swipe by the user on this text bubble causes this attribute and this text bubble to be linked.

With reference to FIG. 23, the keyword lexicon of the parser is enriched by the selection 2305, by the user, of a text fragment included in a text bubble. This selected text fragment is added as a keyword or phrase to the parser lexicon.

With reference to FIG. 24, the keywords and phrases of the parser are grouped by themes, themselves grouped into events according to a predefined ontology. The event "wedding" groups the themes: Flowers, Bar, Images, Cake, Church, Gift. The Flowers theme includes the keywords roses, peony, bouquet and garland.

The page 2400 of textual synthesis displays an attribute representing a theme, like a pictogram, opposite the concerned text bubble. A scan of the user on this text bubble causes the link between this theme and this text bubble.

More generally, in the embodiments of FIGS. 20 to 24, the user's scanning causes the linking of a contribution, represented by a speech bubble, and a category (Identity, Task, Object, Topic). In a reinforcement learning loop, this linking contributes to the learning of the parser by enriching its lexicon of keywords, by reinforcing or weakening the relevance probabilities of the categories for the keywords, and the relevance probabilities of the keywords in the contributions. This makes it possible to build and share among users a knowledge base from the predefined ontology, according to the known methods of ontology-oriented programming.

With reference to FIG. 25, a method 2500 covered by the invention, the implementation of which is illustrated in FIGS. 10-13 includes the following steps:
- opening 2505 the virtual workspace,
- approval 2510 by a user,
- evaluating 2515 the conditions of each call-to-action rule trigger,
- the launch 2520 of the call to action,
- the evaluation 2525 of the conditions for confirming the action rules,
- the execution 2530 of the action,
- the learning 2535 of the action confirmation rules,
- learning 2540 the triggering of the call-to-action rules.

This step 2510 is illustrated in FIG. 11 as reference 1110 by the approval by a voice message from the user and in FIG. 12 as reference 1210 by a nod from the user. This step 2520 is illustrated in FIG. 11 as reference 1115 and in FIG. 12 as reference 1215 by a call to action from the user. This step 2530 is illustrated in FIG. 11 as reference 1105 and in FIG. 12 as reference 1205 by the emission in the conference of a sound signal of approval.

To facilitate their collaboration, the workgroups use internet conferencing tools that allow them to meet virtually. To be effective, these web conferences always require the intervention of a secretary to take the minutes. Text-to-speech applications, easily disturbed by noise and hesitations, are only partially effective. The transcription is often poor. Moreover, it does not distinguish, in the whole of the dictations, what is essential from what is secondary.

It appeared desirable to find a solution to render the essence of a conference on the Internet, which helps users to perform this technical task by means of a guided human-computer interaction process. Referring to FIG. 26, a method 2600 covered by the invention, an implementation of which is illustrated in FIGS. 7-9, includes the following steps:
- the internet conferencing application opens 2605 an internet conferencing page, to which users connect,
- the internet conferencing application runs the silence detection application 2610,
- the silence detection application segments 2615 the dictation of the logged-in users into as many contributions, time-stamps them and matches them with the author's ID,
- the application selects 2620 a contribution,
- a user captures 2625 one of the contributions by activating the capture button or by dragging from right to left on the text bubble representing this contribution,
- the captured contribution is added 2630 to the discussion channel of the home page.

This step 2615 is illustrated in FIG. 7 as reference 705 by a succession of contributions 710 through 712. This step 2625 is illustrated in FIG. 7 under reference 720 by a right-to-left swipe and under reference 730 by the activation of a capture button. This step 2630 is illustrated in FIG. 15 at reference 1510 by adding the captured contribution to the home page discussion channel.

To facilitate their collaboration, workgroups use web conferencing tools that allow them to meet virtually. Users typically have multiple windows on their screen to see each other's faces and share documents. Each speaker is naturally sensitive to how his or her speech is perceived, which is why he or she watches videos of the faces. However, working on a shared document and speaking at the same time requires the user's full attention. Therefore, he does not have enough available attention time to watch the faces, especially when there are more than three people in a meeting.

It appeared desirable to find a solution to provide the speaker and the group of connected users with instruments for measuring the quality of the exchanges in real time and to enrich the discussion feedback document with a measure of this quality.

Figure 27:
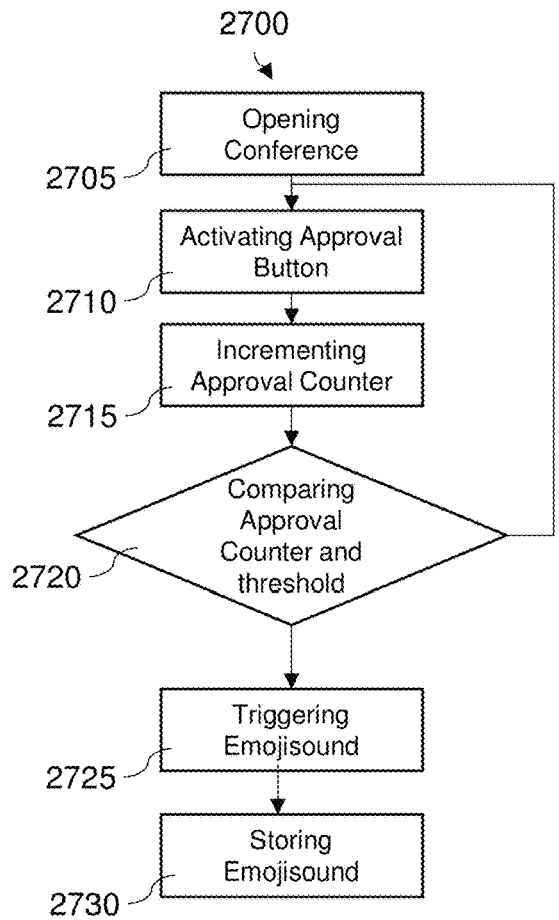
FIG. 27 represents, schematically, a third mode of execution of a particular succession of steps of the process of the present invention.

Referring to FIG. 27, a method 2700 covered by the invention, the implementation of which is illustrated in FIGS. 6 and 11-13, and which includes the following steps:
- the internet conferencing application is opened 2705, in which connected users participate,
- a user activates 2710 an approval button,
- this activation increments 2715 the approval counter,
- the approval counter is compared 2720 to an approval threshold,
- in application of the corresponding action rule, the sound emoji is activated 2725 and
- the sound emoji is time-stamped, its authors' IDs are recorded 2730.

This step 2710 is illustrated in FIG. 6 by activation of an approval button 605. This step 2720 is illustrated in FIG. 13 as reference 1310 by a comparison to an approval threshold. This step 2725 is illustrated in FIG. 13 under references 1305-1306 by the conditions of the action rule and under reference 1320 by the activation of a sound emoji.

To facilitate their collaboration, the work groups use web conferencing tools that allow them to meet virtually. These tools integrate the presentation of shared documents such as an agenda, which lists the points to be discussed during the meeting, or business forms, which list items such as the commercial presentation of the products, the products the customer is interested in, the technical data sheet of the products, the way the price is calculated, the quote . . . It is usually the supplier's responsibility to write the minutes and fill in the business forms after the meeting, which is a time-consuming administrative task and carries a significant risk of losing information.

Figure 28:
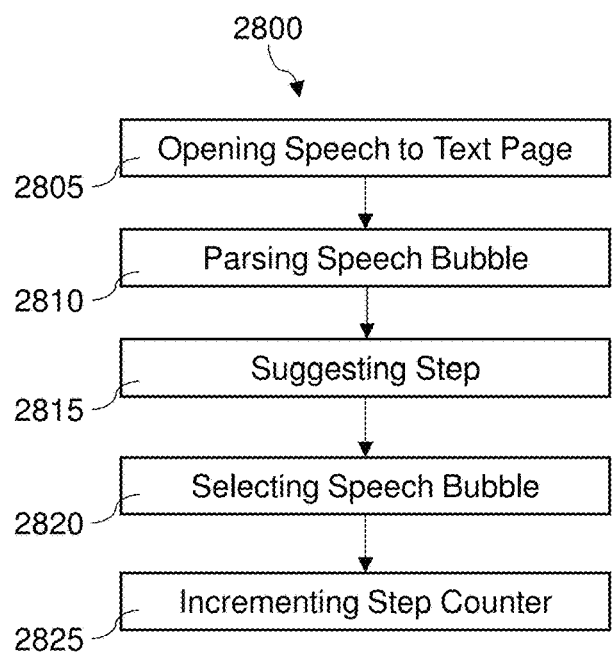
FIG. 28 shows, schematically, a fourth embodiment of a particular sequence of steps of the process of the present invention.

It was found desirable to find a solution to assist web conferencing users to perform the task of taking minutes and filling out business forms by means of a guided human-computer interaction process. Referring to FIG. 28, a method 2800 covered by the present invention, the implementation of which is illustrated in FIGS. 16-19, and which includes the following steps:
- opening 2805 the textual synthesis page,
- the parser searches 2810 the textual summary page for keywords revealing a step of a predefined business process,
- the textual synthesis page displays 2815 an attribute representing this step and associates it with a text bubble,
- the user selects 2820 this text bubble and
- the step counter is incremented 2825.

This step 2810 is illustrated in FIG. 16 as reference 1610 by the predefined business process and as reference 1620 by a step in that business process. This step 2810 is illustrated in FIG. 17 at reference 1705 by the keyword parser search. This step 2815 is illustrated in FIG. 17 at reference 1720 by an attribute representing this step 1620 of this business process 1610. This step 2820 is illustrated in FIG. 17 under reference 1710 by the selection of a speech bubble. This step counter 2825 is illustrated by reconciling FIGS. 16 and 19, which shows the progression of the business process.

To facilitate their collaboration, workgroups use web conferencing tools that allow them to meet virtually. These tools integrate task management tools, such as Trello (Trademark), which allows for the creation of lists for each user, or Asana (Trademark), which allows for the organization of tasks for each participant. The use of these tools has progressed significantly, but in practice requires updating them after meetings, which is a time-consuming administrative task and carries a significant risk of losing information. It appeared desirable to find a solution to assist web conferencing users to update the task management tools through a guided human-computer interaction process.

Figure 29:
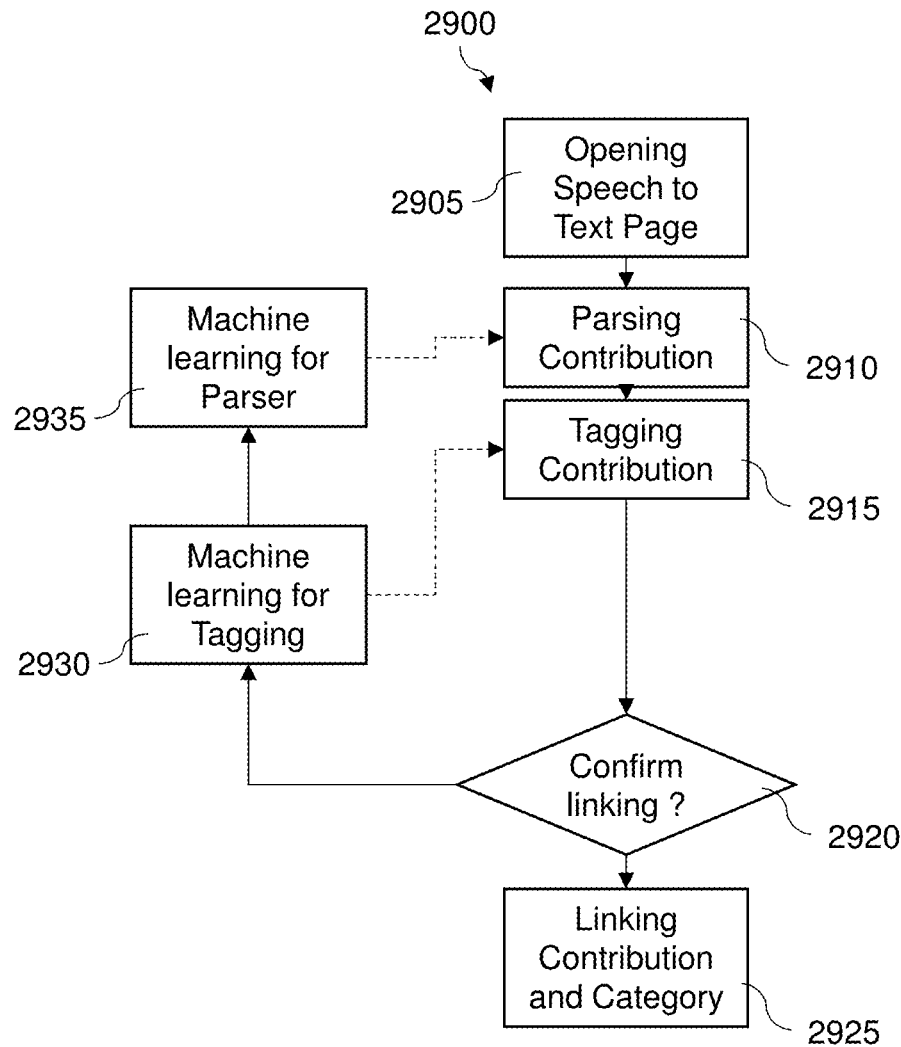
FIG. 29 represents, schematically, a fifth embodiment of a particular succession of steps of the process that is the subject of the present invention.

Referring to FIG. 29, a method 2900 covered by the invention, the implementation of which is illustrated in FIGS. 20-24, includes the following steps:
opening 2905 the textual summary page,
the parser analyzes 2910 the contributions from a predefined lexicon of keywords, revealing a predefined category (identity, task, object, theme)
the textual summary page displays 2915 an attribute representing a category identified by the parser,
the user confirms 2920 the link between a contribution and a category,
the textual summary page displays 2925 a representation of the link between the contribution and the category,
the machine learning 2930 enhances the probability of a match between a keyword and a category defined by the parser, and
machine learning 2935 enriches the parser's database of keywords and categories.

This step 2910 is illustrated in FIG. 20 as reference 2020 by the keyword parser analysis. This step 2915 is illustrated in FIG. 20 as reference 2005 by the display of an attribute representing a category. This step 2920 is illustrated in FIG. 20 under reference 2010 by confirming the link between a contribution and this category. This step 2925 is illustrated in FIG. 20 under reference 2005 by the display of a representation of this link, in this case the insertion of this attribute in the bubble.

The invention claimed is:

1. A method for enriching digital content representative of a conversation, comprising:
in an iterative manner:
a step of capturing an audio signal representative of a voice message,
a step of segmenting the voice message into a segment, said segmentation step comprising a silence detection step, the segment being obtained as a function of the detection of a silence
a step of converting the audio segment into text, called "contribution", and
a step of storing, in a memory, a contribution,
then:
a step of detecting user sentiment towards at least one stored contribution,
a step of associating, in a memory and in relation to at least one stored contribution, at least one attribute corresponding to at least one detected sentiment and
a step of displaying at least one stored contribution and at least one attribute with respect to at least one said contribution, the method further comprises:
a step of automatically creating, according to a creation rule, a query according to at least one sentiment attribute associated with at least one stored contribution and/or at least one stored contribution and/or at least one captured audio signal,
a step of providing, via a human machine interface, the query to at least one user
a step of detecting an action of at least one user with respect to the request and
a step of carrying out a computer processing according to at least one detected action, according to a rule of execution.

2. The method of claim 1, wherein the step of detecting comprises:
a step of collecting an audio signal representative of a voice message transmitted by a user and
a step of determining a sentiment based on the collected audio signal.

3. The method according to claim 1, wherein the detection step comprises:
a step of collecting a video signal representative of a user's attitude,
a step of determining a sentiment based on the collected video signal.

4. The method according to claim 1, wherein the detecting step comprises:
a step of selection by a user, via a human-machine interface, of a stored contribution and
a step of selecting, by a user, via a human-machine interface, a symbol representative of a sentiment towards the selected contribution.

5. The method of claim 1, wherein the creation rule is scalable, the method comprising a step (3090) of learning by reinforcing the rule according to at least one detected action with respect to the request.

6. The method according to claim 1, wherein the creation rule is scalable, the method comprising a step of learning by reinforcing the rule according to at least one action detected with respect to the query.

7. The method according to claim 1, which comprises:
a step of probabilistically determining at least one candidate attribute for association with a stored contribution,
a step of validating or invalidating the determined association and
a step of associating, in a memory, at least one attribute with a stored contribution in case of validation of the association.

8. A method according to claim 1, which comprises:
a step of summarizing the discussion, based on at least one stored contribution and at least one attribute associated with said text and
a step of storing the summarized discussion.

9. A system for enriching digital content representative of a conversation, comprising:
at least one computer terminal, each computer terminal including:
an audio sensor configured to pick up an audio signal representative of a voice message,
computing means configured to:
detect silence in an audio stream captured by the sensor, segmenting the voice message into at least one segment based on the detection of silence converting the voice message into text, referred to as "contribution", and a computer memory for storing at least one contribution, the computing means of at least one said computer terminal being further configured to:

detect a user sentiment towards at least one stored contribution, and associating, in the memory and in relation to the at least one stored contribution, at least one attribute corresponding to the at least one detected sentiment said computer terminal further comprising means for displaying at least one stored contribution and at least one indicator representative of a detected sentiment with respect to said at least one contribution the computing means being further configured to:

automatically create, according to a creation rule, a query according to at least one sentiment attribute associated with at least one stored contribution and/or at least one stored contribution and/or at least one captured audio signal, provide, via a human machine interface, the query to at least one user detect an action of at least one user with respect to the request and carry out a computer processing according to at least one detected action, according to a rule of execution.

\* \* \* \* \*